United States Patent [19]
Gaddi

[11] Patent Number: 4,492,264
[45] Date of Patent: Jan. 8, 1985

[54] CENTRIFUGAL CASTING DEVICE
[75] Inventor: Roberto Gaddi, Torino, Italy
[73] Assignee: Fataluminium S.p.A., Torino, Italy
[21] Appl. No.: 391,423
[22] Filed: Jun. 23, 1982
[30] Foreign Application Priority Data Jul. 6, 1981 [IT] Italy .............................. 67939 A/81

[51] Int. Cl.³ ...................... B22D 13/04; B22D 13/10
[52] U.S. Cl. ................................. 164/292; 164/295; 164/341; 164/342
[58] Field of Search ............... 164/292, 295, 286, 341, 164/114, 342

[56] References Cited
U.S. PATENT DOCUMENTS

| 1,691,464 | 11/1928 | Brown | 164/292 |
|---|---|---|---|
| 1,751,766 | 3/1930 | Smith | 164/292 |
| 1,777,673 | 10/1930 | Kittredge | 164/292 X |
| 2,085,394 | 6/1937 | Sargent | 164/292 X |
| 2,923,986 | 2/1960 | Ross | 164/292 |
| 3,651,858 | 3/1972 | Muench | 164/292 X |
| 3,709,287 | 1/1973 | Klobas | 164/292 |
| 4,117,878 | 10/1978 | Najmowicz et al. | 164/292 |

FOREIGN PATENT DOCUMENTS

| 1281642 | 10/1968 | Fed. Rep. of Germany | 164/341 |
|---|---|---|---|
| 2222160 | 10/1974 | France | 164/114 |
| 2065518A | 7/1981 | United Kingdom . | |

Primary Examiner—Nicholas P. Godici
Assistant Examiner—J. Reed Batten, Jr.
Attorney, Agent, or Firm—Birch, Stewart, Kolasch & Birch

[57] ABSTRACT

The chill mold is mounted on a support which is rotatable about the vertical axis of its casting cavity and is composed of a lower element, an upper element which has a pouring opening, and four peripheral elements arranged in two opposing pairs. The lower element occupies a casting position on the support and coaxial therewith, the upper element is movable between a casting position in which it overlies the lower element coaxially, and a shakeout position in which it does not interfere with the upward removal of the piece from the mold, and the peripheral elements are displaceable radially on the support to allow their movement from a casting position, in which together they surround the upper and lower element, to a shakeout position in which they are further removed from the axis of rotation. The elements of the chill mold are provided with locking keys which are mutually engageable due to the movement of a first pair of the opposed peripheral elements towards their respective casting positions when the lower and upper elements and the opposed peripheral elements of the other pair are substantially in their respective casting position. Keys are also provided for locking the peripheral elements of the first pair in their respective casting positions.

17 Claims, 13 Drawing Figures

CENTRIFUGAL CASTING DEVICE

BACKGROUND AND SUMMARY OF THE INVENTION

The present invention relates to a device for the centrifugal chill-casting of light alloy parts substantially in the form of a body of revolution, such as motor vehicle wheels, of the type in which a chill mold comprising several elements which fit together to define a casting cavity of a shape corresponding to that of the part, and are separable for removal of the part, is mounted on a support which is rotatable about the vertical axis of the casting cavity, and has an upper coaxial pouring opening for the molten metal.

The object of the invention is to provide a device of this type in which the chill mold is subdivided functionally into elements which lend themselves to automatic displacement operations between their casting positions, in which they fit together, and their positions for shakeout of the part, in which they are separated from each other, and in which these elements lock firmly together in their casting position without the need for complicated locking systems which must, in turn be operated manually.

According to the present invention, this object is achieved by means of a device of the type mentioned at the beginning, characterised in that the chill mold is composed of a lower element for defining the lower part of the cavity, an upper element for defining the upper part of the cavity and having the pouring opening, and four peripheral elements arranged in two opposing pairs, which together are able to define the cavity peripherally, the lower element occupying a casting position on the support coaxial therewith, the upper element being displaceable between a casting position in which it overlies the lower element coaxially, and a shakeout position in which it does not interfere with the upward removal of the part from the mold, and the peripheral elements being displaceable radially on the support to allow them to move from a casting position, in which they together surround the upper and lower elements, to a shakeout position in which they are further removed from the axis of rotation, and in that the elements of the chill mold are provided with locking means which are mutually engageable due to the movement of a first pair of the opposed peripheral elements towards their respective casting positions when the lower and upper elements and the opposed peripheral elements of the other pair are substantially in their respective casting positions, means being provided for locking the peripheral elements of the first pair in their respective casting positions.

By virtue of this solution, the peripheral elements which have been termed conventionally the "first pair" provide for the locking of all the other elements by locking means which are engageable simply by the sliding movement of the elements themselves. The only locking means which require an operating movement are those which lock the peripheral elements of the first pair in their respective casting positions.

BRIEF DESCRIPTION OF THE DRAWINGS

The characteristics and advantages of the invention will be better understood from the reading of the detailed description which follows with reference to the appended drawings, which illustrate a preferred embodiment and in which.

DETAILED DESCRIPTION OF THE INVENTION

Figure 1:
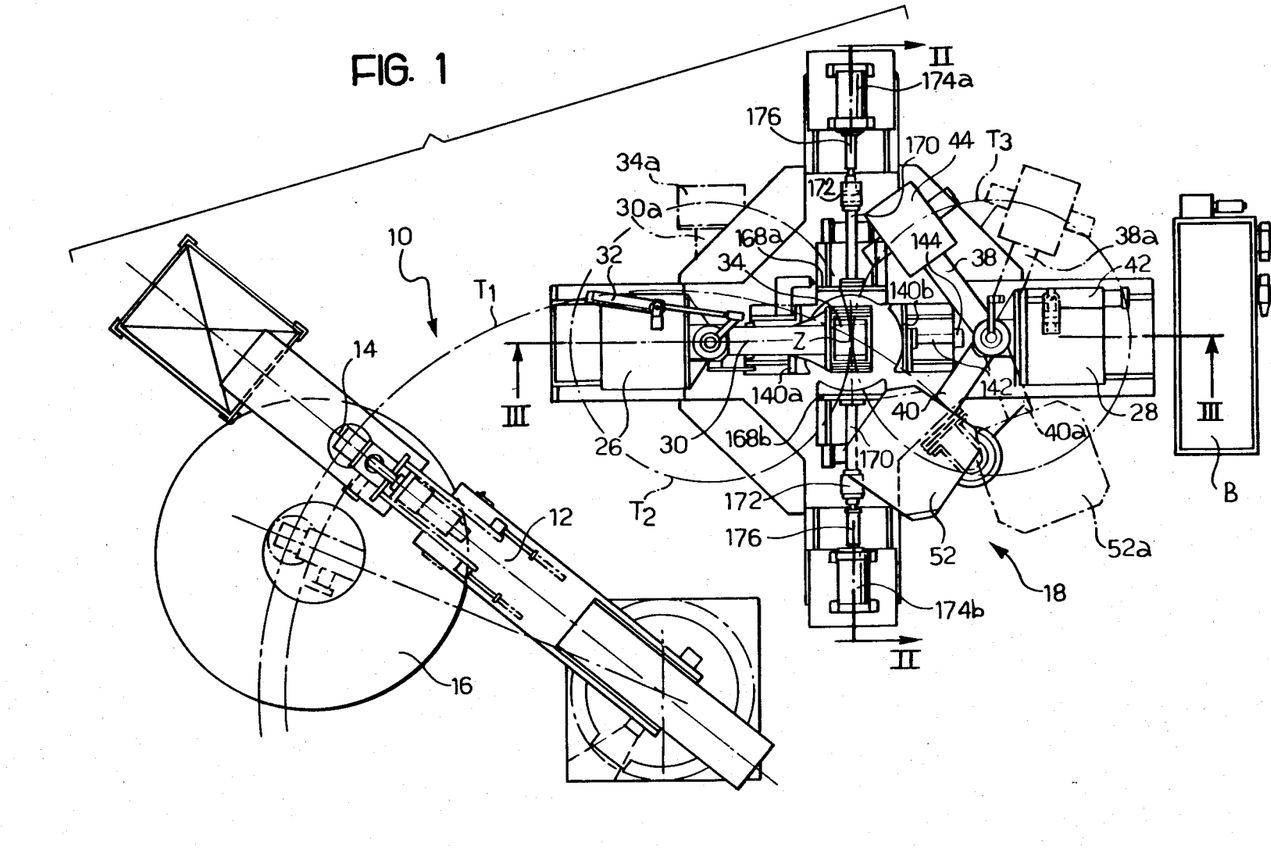
FIG. 1 is a plan view from above of a centrifugal casting device according to the invention and a casting machine associated with the device but not forming part of the invention.
Figures 7, 8, 9:
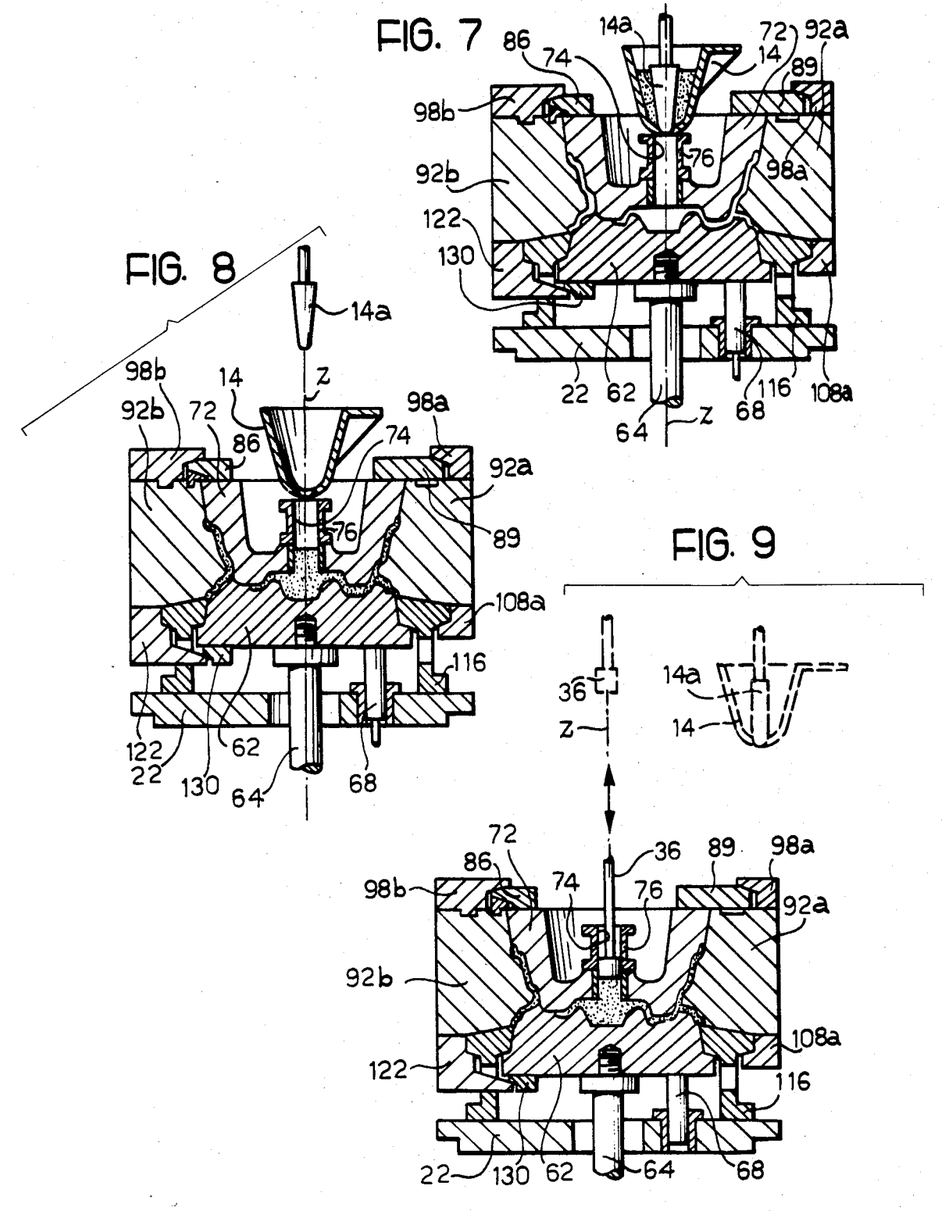
FIGS. 7 to 10 are schematic vertical sections which illustrate corresponding successive stages from the beginning of casting to the shakeout of a part.

Referring to FIG. 1, a casting machine, generally indicated 10, which does not form part of the invention, comprises a rotatable arm 12 which is mounted on a column and carries towards its free end a casting bucket or ladle 14 best shown schematically in FIGS. 7 and 8. The ladle 14 is able to descend into a furnace 16 which contains a molten light alloy, and pick up a measured quantity of alloy intended for the casting of a part, such as a motor vehicle wheel.

The ladle 14 is movable from the lifting station, defined by the furnace 16, along a path in the form of an arc of a circle $T_1$ which brings it to the central axis Z of a casting device according to the invention, generally indicated 18.

Figure 2:
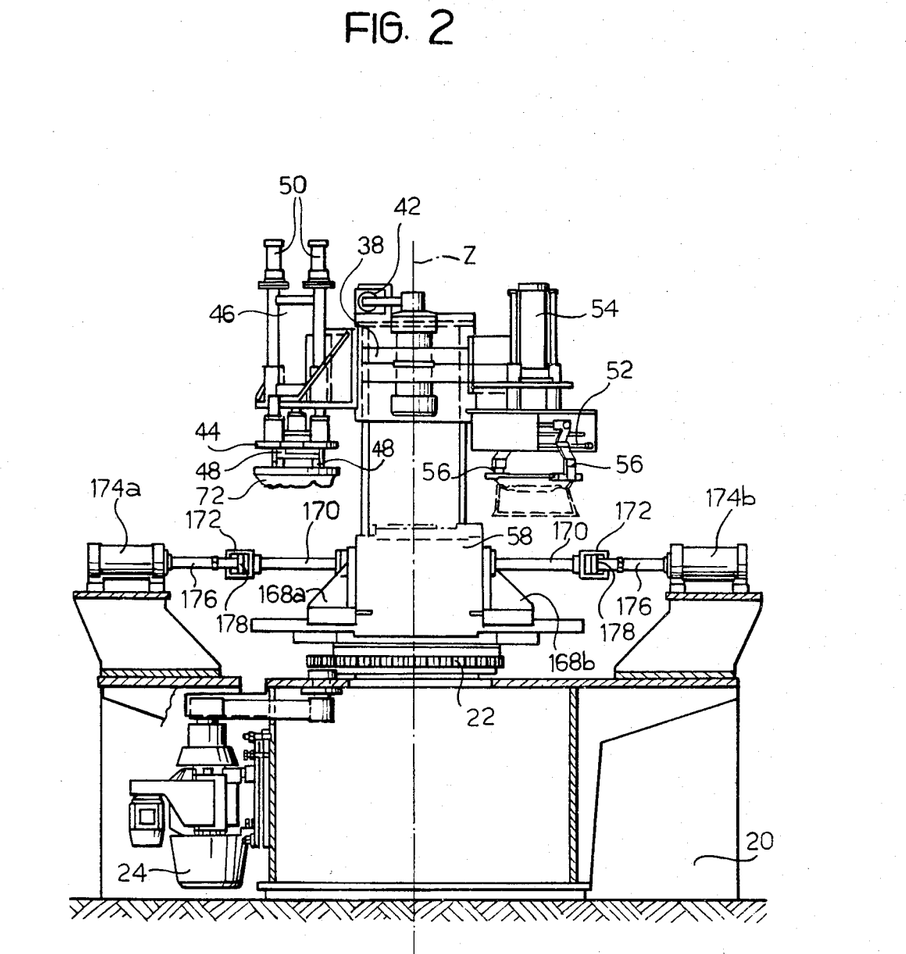
FIGS. 2 and 3 are elevational views of the centrifugal casting device, sectioned substantially along the respective lines II—II and III—III of FIG. 1.
Figure 3:
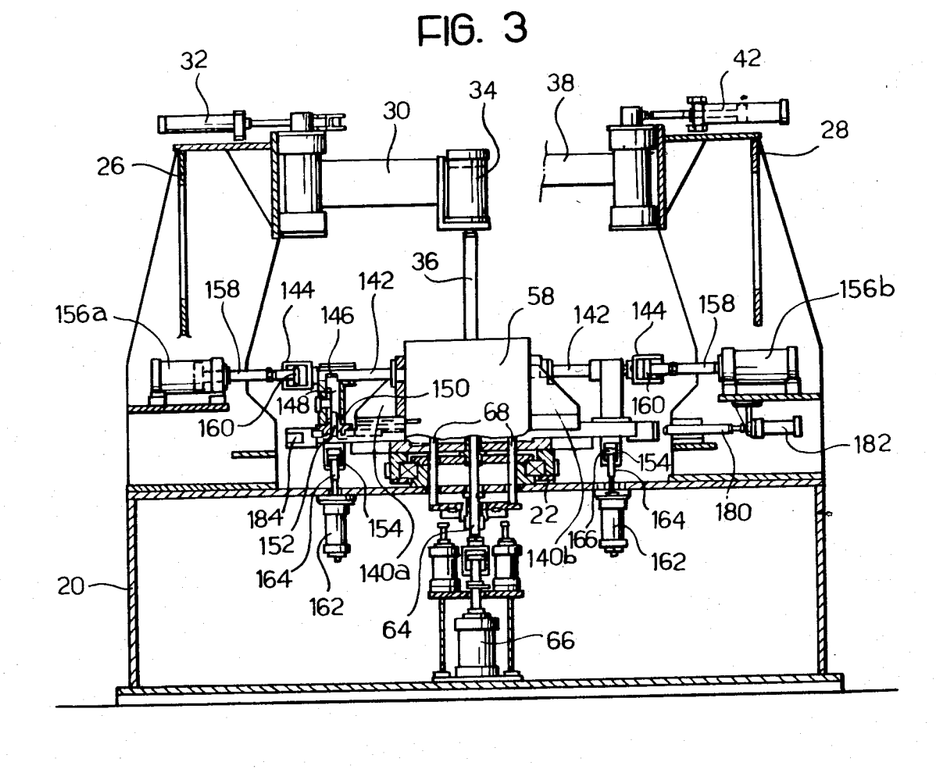

Referring to FIGS. 2 and 3, as well as FIG. 1, the casting device 18 comprises a bench or casing 20 on which a rotary support or table 22 is mounted for rotation about the axis Z. The support 22 is rotated by an electric drive variator 24.

The casing 20 carries a pair of superstructures or uprights 26 and 28. The upright 26 carries an arm 30 rotatable about a vertical axis under the action of a fluid actuator 32. The free end of the arm 30 carries a fluid actuator 34 with a vertical axis, to the piston rod of which is fixed a plunger 36 directed vertically downwardly, and the function of which will be specified below. The arrangement is such that the plunger 36 follows a path $T_2$ in the form of an arc of a circle which passes through the axis Z of rotation of the support 22.

At the upper end of the other upright 28 is mounted a pair of arms 38 and 40 which are staggered angularly and fixed to each other. The two arms 38 and 40 are rotatable about a vertical axis under the action of a fluid actuator 42.

The arm 38 carries at its free end a gripper unit 44 which can be raised and lowered by means of a vertical axis fluid actuator 46. The gripper unit 44 comprises a pair of jaws 48 which can be opened and closed by means of rotation imparted to them by respective fluid actuators 50.

The function of the gripper unit 44, as will be explained below, is that of moving an upper element of a casting chill mold between its casting position and its part shakeout position. To this end, the arm 38 is disposed so that the axis of the gripper unit 44 follows a path $T_3$ passing through the axis of rotation Z of the support 22.

The arm 40 carries at its free end a further gripper unit 52 which can be raised and lowered by means of a vertical axis fluid actuator 54. The function of the gripper unit 52 is to pick up, by means of jaws 56, the part removed after opening of the chill mold. The jaws 56 are also controlled by a fluid actuator (not shown).

The arrangement of the arm 40 is also such that the axis of the gripper unit 52 follows the path $T_3$ passing through the axis Z of rotation of the support 22.

The table 22 carries a chill mold illustrated schematically by 58 in FIGS. 2 and 3, and best illustrated in FIGS. 4 to 6 to which reference will now be made.

Other details which appear in FIGS. 1 to 3 will be described further on.

Figure 4:
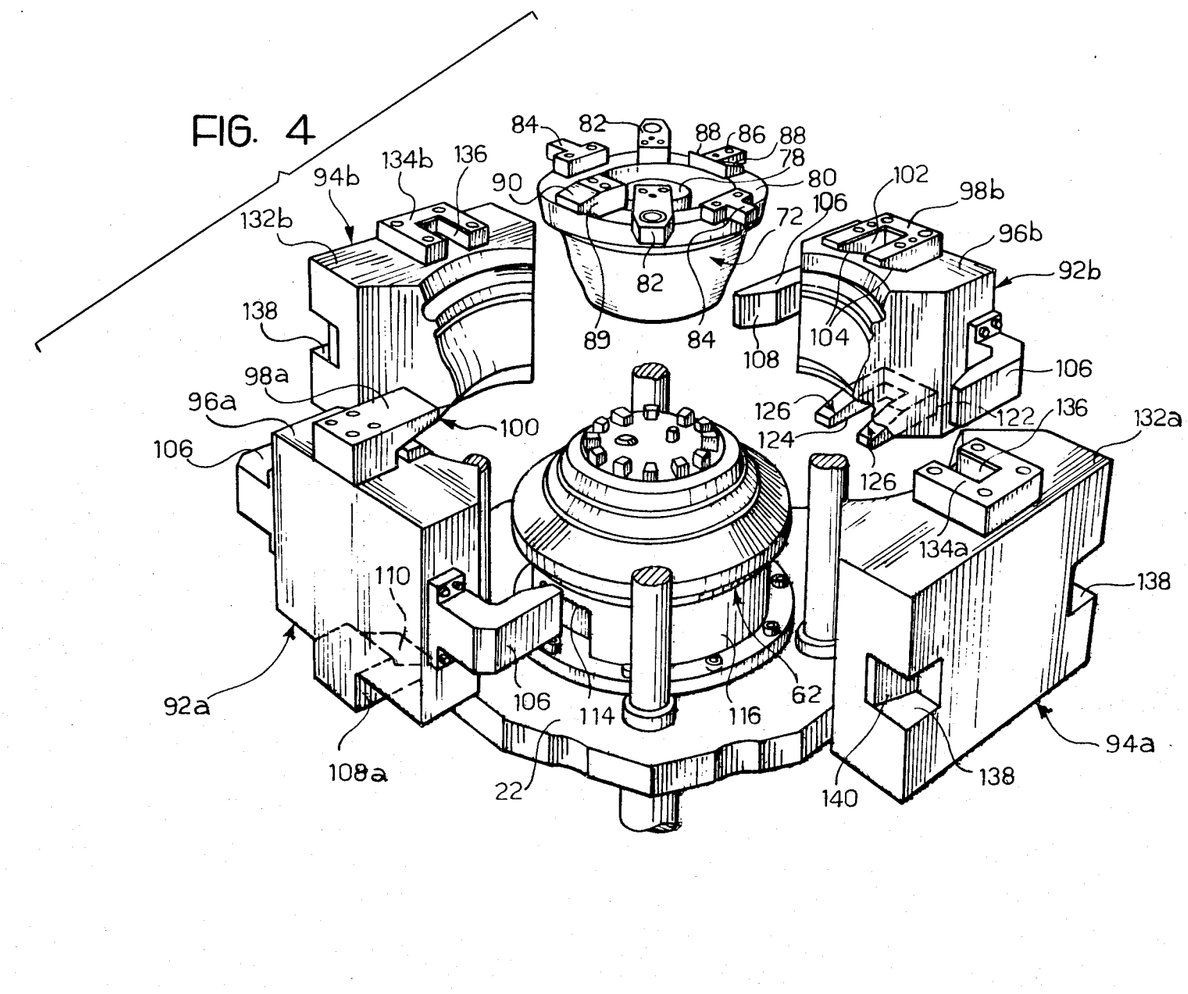
FIG. 4 is an exploded perspective view of the chill mold of the casting device.
Figure 5:
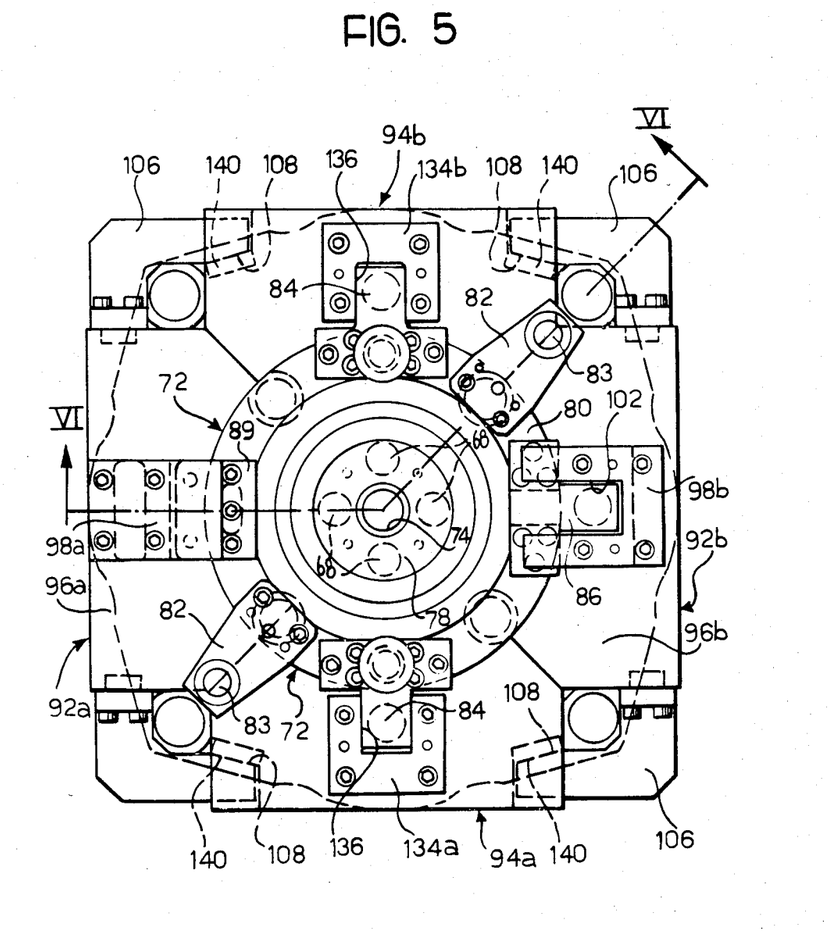
FIG. 5 is a plan view of the chill mold in a closed condition.
Figure 6:
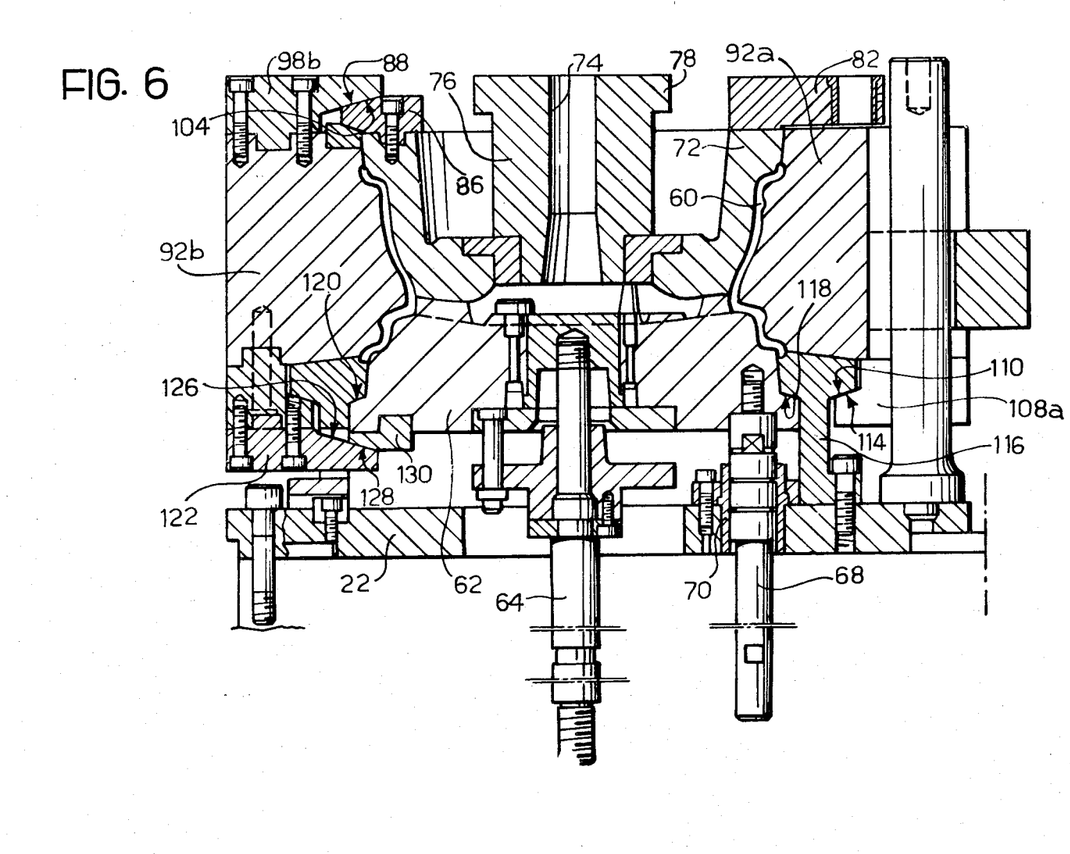
FIG. 6 is a section of the chill mold taken along the broken line VI—VI of FIG. 5.

In FIGS. 4 to 6 is shown a chill mold for the centrifugal casting of a light alloy wheel for motor vehicles, as may be deduced from the shape of the casting cavity indicated 60 in FIG. 6. However, a chill mold for casting parts of other types having essentially the form of a body of revolution may be made according to the same principles.

The chill mold comprises a lower element 62 having essentially the form of a body of revolution. The lower element 62 is disposed coaxially on the rotary support or table 22, and is carried by a central shaft 64 connected to the piston rod of a fluid actuator 66 located beneath the table 22. The lower element 62 can be lifted by means of the fluid actuator 66 to a casting position, where it defines the lower part of the cavity 60 as shown in FIG. 6, and can be lowered to a shakeout position. The lower element 62 is guided in its raising and lowering movements by means of columns 68 which are slidable in bushes 70 and extend through the table 22.

A further element of the chill mold is an upper element 72 also having essentially the form of a body of revolution. The upper element 72 has a central pouring opening 74 defined by a sleeve 76. The sleeve 76 is provided with an upper holding collar 78 which can be grasped by jaws 48 of the gripper unit 44 (FIG. 2) to allow it to be transferred between a casting position (FIG. 6), in which it defines the upper part of the cavity 60, and a shakeout position. The upper element 72 is shown in the shakeout position in FIG. 2. This position corresponds to the position of the gripper unit indicated 34a in FIG. 1.

The upper element 72 also has an upper annular face 80 to which various positioning and locking elements are fixed. Two of these elements consist of apertured radial bush appendages 82 which can be fitted from above onto respective columns 83 carried by the table 22 for the purpose of positioning.

Other elements consist of diametrally-opposed squared tongues 84 which project from the edge of the face 80. These tongues 84, as will be explained below, act as angular keying and bearing means for the upper element 72. A further squared tongue 86, projecting radially and disposed at 90° to the tongues 84, forms part of an element which has a pair of wedging surfaces 88 sloping outwardly of the element 72.

In positions diametrally opposite the tongue 86 and the wedging surfaces 88, the upper element 72 carries on its face 80 a further lug or block 89 which has a wedging surface 90 also outwardly inclined.

In order to complete the chill mold four peripheral elements in two opposing pairs are also provided.

Two of these elements, indicated respectively 92a and 92b, form what will be termed conventionally the "first pair" of peripheral elements. The opposed elements of the other pair are indicated by 94a and 94b respectively.

These peripheral elements 92a, 92b, 94a, 94b are in the form of blocks which are rather similar to each other, and each defines, with its internal arcuate surfaces, substantially a quarter of the periphery of the casting cavity 60.

The peripheral elements 92a, 92b of the first pair have flat upper faces 96a, 96b on which are fixed respective blocks 98a, 98b. The block 98a has a lower wedging surface 100, which as will be seen below, is arranged to cooperate with the wedging surface 90. The block 98b has a squared C-shape in plan so as to define a square seat 102 for receiving the tongue 86. On the two sides of the seat 102, there is also a pair of lower wedging surfaces 104 which, as will be better seen below, are arranged to cooperate with the wedging surfaces 88.

To the sides of each peripheral element 92a 92b of the first pair are fixed perpendicularly respective teeth 106 which project towards the interior of the chill mold. Each of these teeth 106 has a wedging surface 108. The wedging surfaces 108 of a particular element 92a or 92b face each other and diverge towards the interior of the mold.

The peripheral element 92a is provided on its underside with a block 108a which is similar to the block 98a, and has a ramp surface 110 arranged to cooperate with a corresponding ramp surface 114 (FIG. 6) of an annular element 116 which surrounds the lower element 62 of the mold; an upper internal edge of this ramp surface defines a small part of the casting cavity 60. The annular element 116 has an internal shoulder surface 118 which is intended to bear against a corresponding annular shoulder surface 120 of the lower element 62 in the casting position.

The other peripheral element 92b of the first pair is provided on its underside with a block 122 entirely similar to the upper block 98b and having a squared seat 124 for receiving a corresponding squared tongue (not shown) of the lower element 62 of the chill mold. The seat 124 is flanked by a pair of wedging sursurfaces 126 similar to the surfaces 104 and intended to cooperate with corresponding wedging surfaces 128 carried by a lower block 130 of the lower element 62 (FIG. 6).

Each of the two peripheral elements 94a, 94b of the other pair, like the two peripheral elements 92a, 92b, has a flat upper surface 132a, 132b on which there is a respective block 134a, 134b having a squared C-shape, so as to define a square seat 136 which is, open towards the axis of the mold and arranged to receive a respective tongue 84 with precision.

Each peripheral element 94a, 94b has respective recesses 138 in its outer corners, in which respective wedging surfaces 140 are formed for cooperating with the wedging surfaces 108 of the peripheral elements 92a, 92b of the first pair.

Returning now to FIGS. 1 to 3, the peripheral elements 92a, 92b are carried by respective slides 140a 140b which are movable radially on the rotary support or table 22. To each of the slides is fixed a control shaft 142 which extends radially outwardly and which terminates with an engagement member 144 in the form of a C-shaped bracket with end portions turned towards each other.

In each shaft 142 is formed a slot 146 facing downwardly, in which a key 148 thrust upwardly by a spring 150 is engageable from below. The thrust of the spring 150 has the effect of pushing the respective shaft 142 and its slide 140a towards the axis Z due to the effect of the key 148, that is, to push the corresponding peripheral element 92a or 92b towards the casting position.

Each key has a draw-rod 152 which ends in an engagement member 154 similar to the engagement members 144.

Two aligned fluid actuators 156a, 156b are mounted in opposite positions in the casing 20, the horizontal piston rods 158 of the actuators being directed radially towards the axis Z and terminating with holding members constituted by respective enlarged heads 160. The arrangement is such that, on rotation of the support or table 22, the brackets 144 do not engage the corresponding heads 160 upon passing them. However, when the table is in a predetermined angular position in which the shafts 142 are aligned with the rods 158, the heads 160 are located within the brackets 144 and the actuators 156a, 156b can drive the shafts 142, by pulling and pushing with lost movement constituted by the longitudinal play of the heads in the brackets 144, in order to displace the peripheral elements 92a, 92b of the mold 58 between their casting positions and their shakeout positions.

Two vertical axis fluid actuators 162 are also mounted in the casing 20, each with a piston shaft 164 which is directed upwardly and terminates with an enlarged head 166 arranged to cooperate with the brackets 154 exactly as described for the brackets 144 and the heads 160.

With the table 22 in the said position, the actuators 162 pull the keys 148 downwardly to disengage them from the slots 146 and allow the actuators 156a, 156b to act in the pulling direction to displace the peripheral elements 92a, 92b to the shakeout position.

The peripheral elements 94a, 94b of the other pair are also mounted on respective radial slides similar to the preceding ones, which are indicated by 168a, 168b. To these slides are fixed respective control shafts 170 which extend radially outwardly at 90° to the shafts 142 and which terminate with holding brackets 172 identical to the brackets 144.

The casing 20 carries a further pair of linear fluid actuators 174a, 174b, the horizontal rods 176 of which are similar to the rods 158 and terminate with enlarged heads 178 having the same function as the heads 160.

In the position in which the table 22 is stopped, the actuators 174a 174b have the function of moving the peripheral elements 94a, 94b of the chill mold between their casting position and their shakeout positions.

In the said stopped position, the table 22 is lockable by means of a radial pin 180 which is carried by the shaft of a fluid actuator 182 (FIG. 3) and is arranged to fit in a corresponding radial seat 184 on the table itself.

Reference will now be made to FIGS. 7 to 13 to describe a cycle of casting, centrifuging, shakeout, and subsequent reclosure of the chill mold for a further casting.

In FIG. 7, the elements of the chill mold are all together, the rotary table 22 is stopped, and the ladle 14 has been brought vertically above the pouring opening 74 and lowered to the opening itself.

Subsequently (FIG. 8), the plug 14a of the ladle 14 is raised and the molten metal is cast into the mold through the opening 74.

Once the casting has been carried out, the table 22 is rotated in order to centrifuge the metal in the cavity 60 of the mold 58. As the centrifuging proceeds, the head of metal in the pouring opening 74 drops.

During the centrifuging, the ladle 14 is removed to take it back to the pick-up station 16 (FIG. 1) and the arm 30 is rotated from the position indicated at 30a in FIG. 1 to the position indicated 30 to bring the plunger 36 onto the axis Z (FIG. 9).

Towards the end of the centrifuging, the plunger 36 descends into the opening or duct 74 to compress the metal, making it fill all the spaces in the casting cavity and compacting it in the central area where, in the absence of mechanical pressure, it could form a blowhole after centrifuging.

Figure 10:
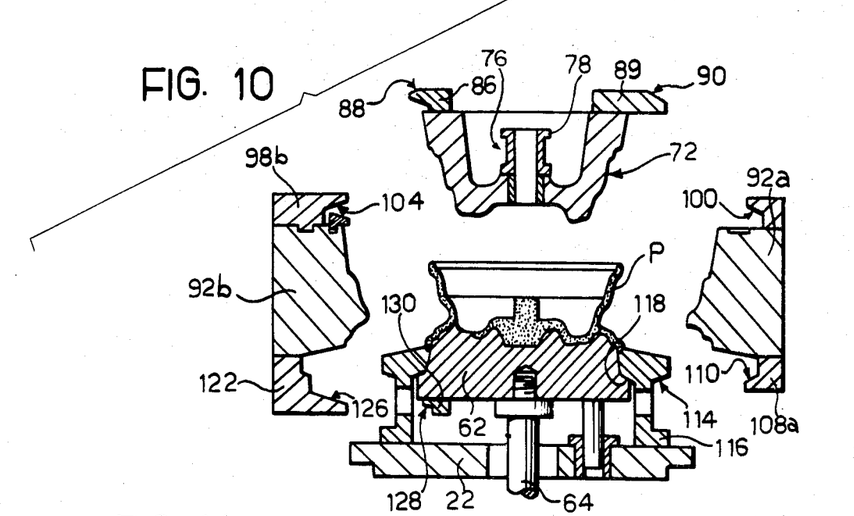

Subsequently, the plunger 36 is raised again, the arm 30 is brought back to the position 30a, the rotation of the support or table 22 is stopped in the said predetermined angular position, and the shakeout is started (FIG. 10).

First of all, the actuators 162 (FIG. 3) are driven in the descending pulling direction to disengage the keys 148 from the slots 146 and unlock the control shafts 142. Thereafter, the actuators 156a, 156b are driven in the pulling direction to move the peripheral elements 92a, 92b of the first pair to the shakeout position. In this movement the wedging surfaces 100, 104, 110 and 126 disengage from the corresponding wedging surfaces 90, 88, 114, 128.

Thus, the wedging surfaces 108 also disengage from the wedging surfaces 140.

In this manner, the withdrawal of the peripheral elements 92a, 92b unlocks all the other elements the lower elements 62, the upper elements 72, and the peripheral elements 94a, and 94b.

The upper element 72 still rests by means of its tongues 84 on the upper surfaces 132a, 132b of the peripheral elements 94a, 94b which are not moved so that the upper element remains supported in the casting position.

Figure 11:
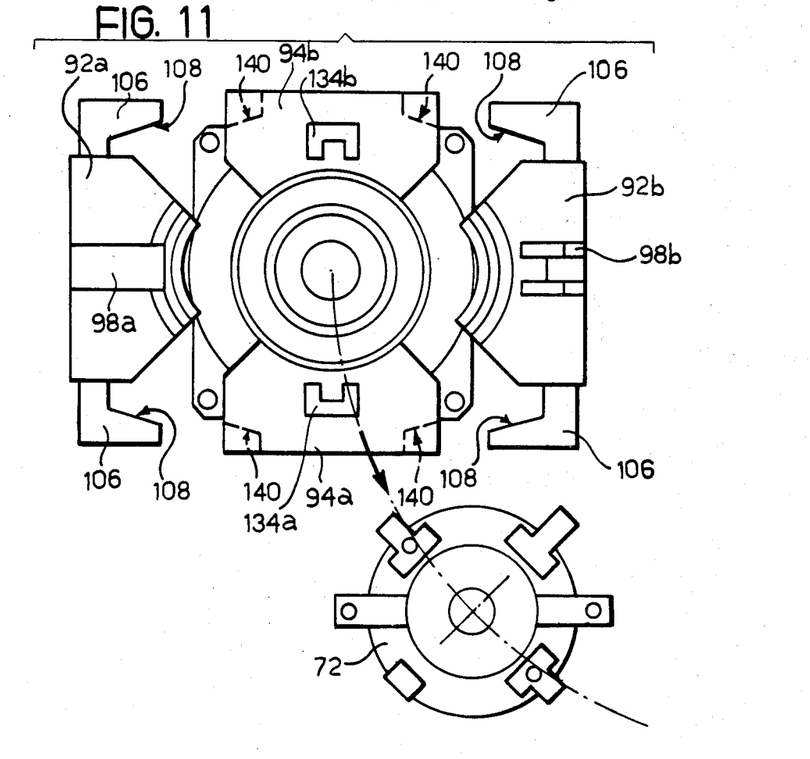
FIGS. 11 and 12 are schematic plan views of two successive stages of the shakeout.

Under these conditions, the arm 38 is rotated to bring the gripper unit 44 onto the axis Z. The gripper unit descends and its jaws 48 are closed under the collar 78, thus grasping the upper element 72. The subsequent rising of the gripper unit 44 lifts the upper element 72 away. Then, the arm 38 is rotated to the position indicated 38a in FIG. 1, thus removing the upper element 72 as illustrated in FIG. 11. At the same time, the arm 40 which moves together with the arm 38 brings the other gripper unit 52 onto the axis Z from the position indicated at 52a in FIG. 1.

Figure 12:
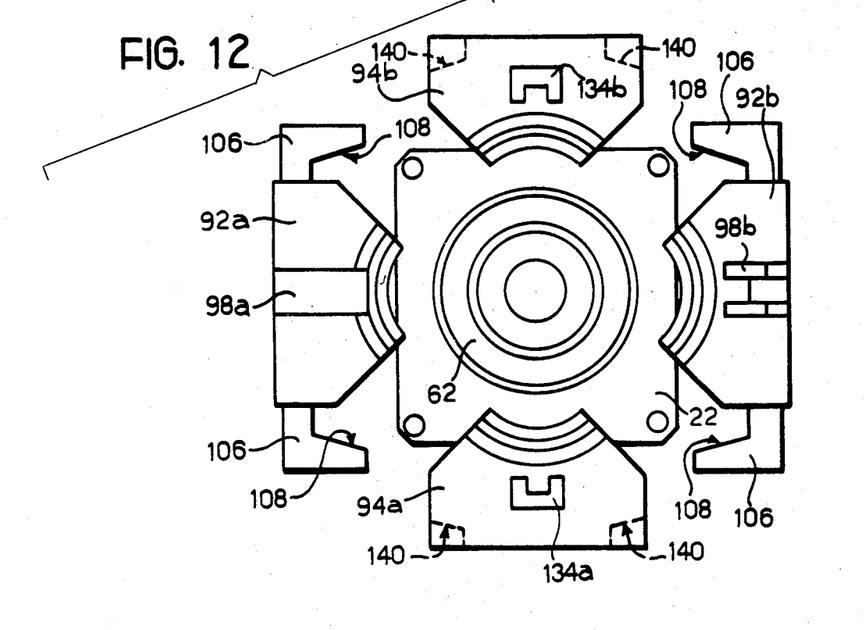

During this manoeuvre, the actuators 174a, 174b act in the pulling direction also displacing the peripheral elements 94a, 94b from the casting position to the shakeout position (FIG. 12).

Under these conditions, the lower element 62 of the mold is made to descend within the annular element 116 by means of the actuator 66 (FIG. 3), completing the shakeout. Only the lower edge of the part P (FIG. 13) still rests on the corresponding upper edge of the annular element 116.

Figure 13:
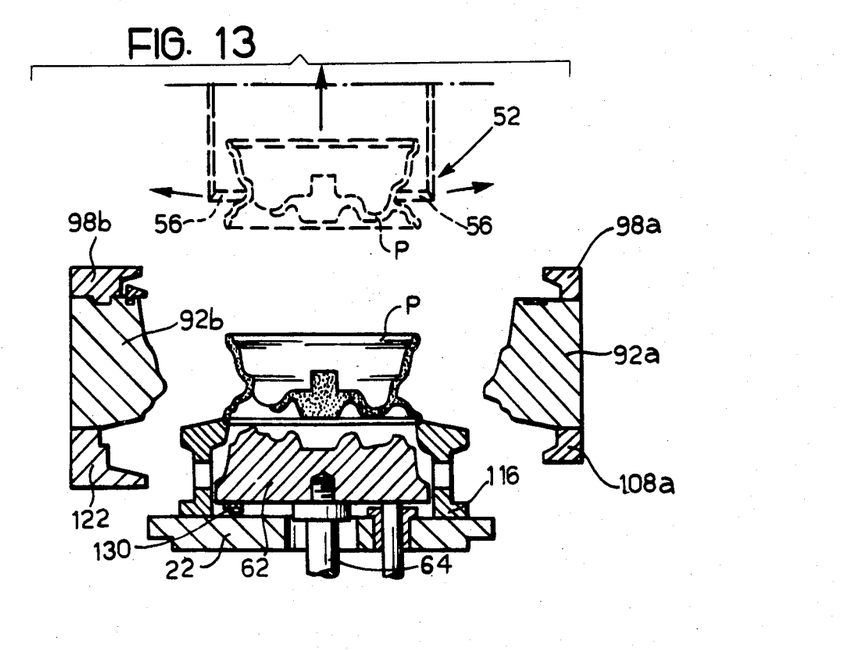
FIG. 13 is a further schematic elevational view which illustrates the final stage in the shakeout of the part.

The gripper unit 52 now descends, its jaws 56 grasp the part P as illustrated in broken outline, the unit 52 is raised again, and the arm 40 is brought back to the position 40a of FIG. 1 where the part is discharged.

All the said movements, driven by the various fluid actuators, are controlled automatically by a control unit indicated B in FIG. 1.

The control unit B also controls the opposite closing movement of the chill mold.

In the closing movements, first of all, the lower element 62 is raised to the casting position (FIG. 10). Then, by means of the fluid actuators 174a, 174b (FIG. 2), the peripheral elements 94a, 94b are brought to their casting positions (FIG. 11).

Subsequently, the upper element 72 is brought by the arm 30 onto the axis Z and lowered again. In this lowering, its bush parts 82 fit onto the columns 83, guiding the upper element 72 in its descent to the casting position. On reaching this position, the tongues 84 are inserted from above onto the seats 136, and the upper element 72 remains supported in the casting position by virtue of the bearing of the tongues 84 on the upper surfaces 132a, 132b of the peripheral elements 94a, 94b which are already located in the casting position.

The gripper unit 44, by virtue of the opening of the jaws 48, then releases the upper element 72, is lifted, and the arm 32 returns to the position indicated 30a in FIG. 1.

In the final closing phase of the mold, the actuators 156a, 156b are driven in the thrusting direction to bring the two peripheral elements 92a, 92b back to the casting position also. In this movement, the wedging surfaces 100, 104, 110, 126 re-engage the corresponding wedging surfaces 90, 88, 114, 128. The cooperation of the surfaces 100 and 90 with the surfaces 104 and 88 exerts a downward clamping force on the upper element 72. The cooperation of the surfaces 110 and 114 reacts to this clamping force since the surface 114 is fixed. The cooperation of the surfaces 126 and 128 exerts an upward clamping force on the lower element 62.

Thus, the wedging surfaces 108 and 140 also cooperate, achieving a clamping force on the two peripheral elements 94a, 94b.

Finally, pressure is released from the actuators 162 (FIG. 3), so that the respective springs 150 thrust the keys 48 upwardly, and these wedge in the slots 146 of the shafts 142, ensuring the locking of the peripheral elements 92a, 92b of the first pair in position.

Thus, the chill mold 58 is firmly locked in the casting position of FIG. 6, and the next casting may be started.

I claim:

1. In a device for the centrifugal chill-casting of light alloy parts substantially in the form of a body of revolution, such as motor vehicle wheels, of the type in which a chill mold comprising several elements which fit together to define a casting cavity of a shape corresponding to that of the part, and are separable for removal of the part, is mounted on a support which can be rotated about the vertical axis of the casting cavity, and has an upper coaxial pouring opening for pouring molten metal into the mold, the improvement wherein the chill mold comprises a lower element for defining the lower part of the cavity, an upper element for defining the upper part of the cavity and including the pouring opening, and four peripheral elements located in two opposing pairs, which together are able to define the cavity peripherally, the lower element occupying a casting position on the support coaxial therewith, the upper element being movable between a casting position in which it overlies the lower element coaxially and a shakeout position in which it does not interfere with the upward removal of the part from the mold, and the peripheral elements being individually displaceable radially on the support to enable them to be moved from a casting position, in which they together surround the upper and lower elements, to a shakeout position in which they are further removed from the axis of rotation, and wherein the elements of the chill mold are provided with locking means which are mutually engageable due to the movement of a first pair of the opposed pheripheral elements towards their respective casting positions when the lower and upper elements and the opposed peripheral elements of the other pair are substantially in their respective casting positions and means being provided for locking the peripheral elements of the first pair in their respective casting positions.

2. A device as claimed in claim 1, wherein the locking means for the peripheral elements of the first pair comprise, for each of these elements, a key inserted transversely in a corresponding seat of a part fixed to the element itself so as to exert a thrust on this element in its casting position.

3. A device as claimed in claim 1, wherein the support is provided with vertical guide columns for the upper element of the chill mold, and this upper element is provided with radial bush appendages which can be fitted onto these columns from above.

4. A device as claimed in claim 1, wherein means are provided for angular keying of the upper element of the chill mold with respect to at least some of the peripheral elements.

5. A device as claimed in claim 1, wherein the upper element of the chill mold is provided with projecting appendages to support it in the casting position on the upper faces of the peripheral elements of the other pair.

6. A device as claimed in claim 4, wherein the angular keying means comprise squared tongues which project radially from the upper element of the chill mold and corresponding squared seats formed in the peripheral elements for receiving the tongues, the squared seats of the peripheral elements of the other pair, when these elements are in the casting position, being arranged to receive the corresponding tongues when the upper element descends to the casting position and, when the upper element is in the casting position, being engageable by the squared seat of one of the peripheral elements of the first pair when these elements are displaced radially towards the casting position, at least one pair of tongues also having the function of supporting the upper element in the casting position by virtue of their bearing on corresponding upper faces of the peripheral elements of the other pair.

7. A device as claimed in claim 1, wherein the peripheral elements are mounted on the support by means of respective radial slides having respective control shafts which extend radially outwardly and terminate with respective engagement members, and wherein a linear actuator is associated with each slide and is located in a position which is fixed about the rotary support and has a control rod which extends radially inwards and terminates with an engagement member complementary to those of the shafts, these engagement members being so disposed as to interfere radially with each other to allow the control actuators to pull and thrust the shafts of the slides when the support is in a predetermined angular position, while allowing the passage of the engagement members of the shafts relative to the engagement members of the rods during the rotation of the support.

8. A device as claimed in claim 7, wherein the control shafts of the slides of the peripheral elements of the first pair have slots oriented vertically, and the means for locking these elements in their casting positions comprise keys engageable in these slots vertically from below so as to exert a force on the shafts thrusting the elements to the casting positions, in that fixed to the keys are respective draw-rods which are slidable vertically in the support, being urged upwardly by resilient means to the position in which the keys are engaged in the slots, and which have respective engagement members at their lower ends, and in that a linear actuator is associated with each draw-rod and is located in a fixed position beneath the rotary support and a control shaft which extends upwardly and terminates with an engagement member complementary to those of the draw-rods, these engagement members being so disposed as to interfere vertically with each other to allow the drive actuators to pull the rods in order to disengage the keys from the slots, when the support is in a predetermined angular position, while allowing the passage of the engagement members of the rods relative to the engagement members of the shafts during the rotation of the support.

9. A device as claimed in claim 7 or claim 8, wherein the engagement members of the shafts and rods are constituted one by an enlarged terminal head and the other by a C-shaped bracket arranged to embrace the head and having terminal turned-back portions which face each other to engage the head in order to pull it.

10. A device as claimed in claim 1, wherein associated with the rotary support is an arm which is rotatable by an actuator, the free end of the arm being so disposed as to travel along a path which passes through the axis of rotation of the support and carrying a gripping and carrying member for the upper element of the chill mold which is raisable and lowerable by means of actuators.

11. A device as claimed in claim 10, wherein the pouring opening is defined by a sleeve with an upper holding collar which can be grasped by the gripping member.

12. A device as claimed in claim 1, wherein the pouring opening is a cylindrical duct, and associated with this duct is a plunger which is selectively movable above the duct and is insertable therein to exert a mechanical compressive force on the molten metal cast in the mold.

13. A device as claimed in claim 12, wherein associated with the rotary support is an arm which is rotatable by an actuator, the free end of the arm being so disposed as to move along a path which passes through the axis of rotation of the rotary support and carrying the plunger which is raisable and lowerable by means of an actuator.

14. A device as claimed in claim 10, wherein the arm of said gripping and carrying member is fixed to another similar arm which is staggered angularly and which carries at its free end a gripper holding and removing unit for the part after its shakeout, said unit being operable to raise and lower, as well as grip and release, by means of an actuator.

15. In a device for the centrifugal chill-casting of light alloy parts substantially in the form of a body of revolution, such as motor vehicle wheels, of the type in which a chill mold comprising several elements which fit together to define a casting cavity of a shape corresponding to that of the part, and are separable for removal of the part, is mounted on a support which can be rotated about the vertical axis of the casting cavity, and has an upper coaxial pouring opening for pouring molten metal into the mold, the improvement wherein the chill mold comprises:
a lower element for defining the lower part of the cavity;
an upper element for defining the upper part of the cavity and including the pouring opening; and
four peripheral elements located in two opposing pairs, which together are able to define the cavity peripherally;
the lower element occupying a casting position on the support coaxial therewith, the upper element being movable between a casting position in which it overlies the lower element coaxially and a shakeout position in which it does not interfere with the upward removal of the part from the mold, and the peripheral elements being individually displaceable radially on the support to enable them to be moved from a casting position, in which they together surround the upper and lower elements, to a shakeout position in which they are further removed from the axis of rotation; and
wherein the elements of the chill mold are provided with locking means which are mutually engageable due to the movement of a first pair of the opposed peripheral elements towards their respective casting positions when the lower and upper elements and the opposed peripheral elements of the other pair are substantially in their respective casting positions and means being provided for locking the peripheral elements of the first pair in their respective casting positions;
said mutual locking means comprise cooperating wedging surfaces so disposed on the first pair of the opposed peripheral elements of the chill mold, that, as a result of the movement of the peripheral elements of the first pair, the upper and lower elements and the peripheral elements of the other pair are forced towards each other.

16. A device as claimed in claim 15, wherein, on each peripheral element of the first pair, the wedging surfaces are formed on respective tapered appendages which comprise a lower appendage arranged to engage the lower element from below, an upper appendage arranged to engage the upper element from above, and opposite lateral appendages arranged to engage the peripheral elements of the other pair from the exterior.

17. A device as claimed in claim 15 or claim 16, wherein the lower element of the chill mold is vertically displaceable on the rotary support between the casting position and a lower shakeout position by means of an actuator incorporated in the support, wherein this lower element is surrounded by an annular element fixed to the support, which has an upper edge defining part of the casting cavity and is intended to support a light alloy part chilled in the mold after the lowering of the lower element, and wherein one of the peripheral elements of the first pair also has a wedging surface cooperating with a corresponding wedging surface of the annular element.

* * * * *